United States Patent
Redding et al.

(10) Patent No.: US 7,716,348 B1
(45) Date of Patent: May 11, 2010

(54) LICENSE MANAGEMENT SYSTEM AND METHOD WITH LICENSE BALANCING

(75) Inventors: Mark E. Redding, Newport Beach, CA (US); Logan A. Badia, Fullerton, CA (US); Sandeep Handa, New Delhi (IN); Hemant Sharma, Lake Forest, CA (US); Sanjay Chopra, New Delhi (IN); Vikram Duvvoori, Salinas, CA (US); Shankar Ramamoorthy, Santa Cruz, CA (US); Ajay Tripathy, New Delhi (IN)

(73) Assignee: SafeNet, Inc., Belcamp, MD (US)

( * ) Notice: Subject to any disclaimer, the term of this patent is extended or adjusted under 35 U.S.C. 154(b) by 2621 days.

(21) Appl. No.: 09/648,720

(22) Filed: Aug. 25, 2000

Related U.S. Application Data

(60) Provisional application No. 60/152,785, filed on Sep. 3, 1999.

(51) Int. Cl.
*G06F 15/16* (2006.01)
(52) U.S. Cl. .......................................... 709/229; 709/59
(58) Field of Classification Search .................. 709/203, 709/217–219, 223, 226, 229; 707/10, 104.1, 707/103 X; 705/59
See application file for complete search history.

(56) References Cited

U.S. PATENT DOCUMENTS

| | | | |
|---|---|---|---|
| 4,652,990 A | 3/1987 | Pailen et al. | |
| 4,658,093 A | 4/1987 | Hellman | |
| 4,685,055 A | 8/1987 | Thomas | |
| 4,754,395 A | 6/1988 | Weisshaar et al. | |
| 4,780,821 A | 10/1988 | Crossley | |
| 4,791,565 A | 12/1988 | Dunham et al. | |
| 4,796,220 A | 1/1989 | Wolfe | |
| 5,138,712 A | 8/1992 | Corbin | |
| 5,146,575 A | 9/1992 | Nolan, Jr. | |
| 5,390,297 A | 2/1995 | Barber et al. | |
| 5,579,222 A * | 11/1996 | Bains et al. | 717/167 |
| 5,745,879 A * | 4/1998 | Wyman | 705/1 |

(Continued)

FOREIGN PATENT DOCUMENTS

GB  2316503  8/1996

OTHER PUBLICATIONS

PCT International Search Report as issued in International Application No. PCT/US00/24359, Mailing Date Aug. 2, 2001.

(Continued)

*Primary Examiner*—Douglas B Blair
(74) *Attorney, Agent, or Firm*—Drinker Biddle & Reath LLP

(57) ABSTRACT

A system for balancing a distribution of allocations for protected software over a communication network is disclosed. The system is comprised of at least one client computer and a pool of license servers coupled to the communication network. The client computers request authorizations to use the protected software, while a distribution of allocations is managed among the pool of servers for tracking and managing available allocations for using the protected software. One license server in the pool is designated as the current leader server. When a particular license server does not have a selectable minimum amount of available allocations, the current leader server re-assigns, where possible, the allocations within the pool by updating memory containing the distribution tables of license servers in the pool, to give at least one additional allocation to the particular license server.

31 Claims, 5 Drawing Sheets

U.S. PATENT DOCUMENTS

| | | | | |
|---|---|---|---|---|
| 5,752,041 | A | * | 5/1998 | Fosdick ..................... 717/178 |
| 5,790,664 | A | | 8/1998 | Coley et al. |
| 5,845,065 | A | * | 12/1998 | Conte et al. ................. 713/200 |
| 5,862,348 | A | | 1/1999 | Pedersen |
| 5,903,650 | A | * | 5/1999 | Ross et al. .................... 705/59 |
| 5,950,214 | A | * | 9/1999 | Rivette et al. ............... 715/512 |
| 6,189,146 | B1 | * | 2/2001 | Misra et al. ................. 717/177 |
| 6,574,612 | B1 | * | 6/2003 | Baratti et al. ................. 705/59 |
| 6,728,766 | B2 | * | 4/2004 | Cox et al. ................... 709/220 |
| 6,842,896 | B1 | * | 1/2005 | Redding et al. ............. 717/172 |
| 6,968,384 | B1 | * | 11/2005 | Redding et al. ............. 709/229 |
| 7,035,918 | B1 | * | 4/2006 | Redding et al. ............. 709/223 |
| 7,065,508 | B2 | * | 6/2006 | Schull .......................... 705/59 |
| 7,080,051 | B1 | * | 7/2006 | Crawford .................... 705/400 |
| 7,082,521 | B1 | * | 7/2006 | Nanja ............................ 713/1 |
| 7,278,142 | B2 | * | 10/2007 | Bandhole et al. ............ 718/104 |
| 7,457,944 | B1 | * | 11/2008 | Nanja ............................ 713/1 |
| 7,496,920 | B1 | * | 2/2009 | Bandhole et al. ............ 718/104 |

OTHER PUBLICATIONS

PC Week, "Strength in Numbers", vol. V3, Jul. 1986, p. 57.
Digital Review, "Apollo Licenses Concurrent Users on Entire Network", vol. 4, No. 20, Oct. 26, 1987, p. 6.
IBM Technical Disclosure Bulletin, "Software Serial Number", vol. 26, No. 7B, Dec. 1983, pp. 3918-3919.
Chovan, J., "Handling Site-License Agreements and Public Domain Software Packages: What are the Issues?", ACM SIGUCCS Conference, Toledo, Ohio, Sep. 30-Oct. 4, 1985, pp. 175-179.
Brown, B., "Microcomputer Software Exchange at Michigan State University", ACM SIGUCCS Conference, Toledo, Ohio, Sep. 30-Oct. 4, 1985, pp. 185-197.
Halaris, A., Sloan, L., "Networked Microcomputers: New Challenges for Computing Center Management", SIGUCCS Newsletter, vol. 13, No. 4, Winter 1983, pp. 20-26.
Gerber, H., Pringle, G., "Instructional Computing and Local Area Networking", SIGUCCS Newsletter, vol. 17, No. 2, Summer 1987, pp. 8-13.
Kreutzer, A., "An On-Line System for Controlling and Monitoring Software Usage in a Microcomputer Laboratory", SIGUCCS Newsletter, vol. 18, No. 2, Summer 1988, pp. 29-32.
Allen, K., "Software Lending Library", ACM-SIGUCCS XII, Conference Proceedings, Nov. 1984, pp. 171-172.
InfoWorld, "FST Introduces a Copy Protection Scheme for Nets", vol. 7, No. 7, Nov. 25, 1985, p. 14.
Micro Communications, "Software Protection", vol. 2, No. 5, May, 1985, pp. 35-37.
PC World, "LAN Licensing Lags", vol. 3, No. 11, Nov. 1985, pp. 320, 324, 328.
Rifkin, A. et al, "RFS Structural Overview", USENIX Summer Conference Proceedings, Atlanta, Ga., Jun. 9-13, 1986, pp. 248-259.
Gould, E., "The Network File System Implemented on 4.3BSD", USENIX Conference, Atlanta, Ga., Jun. 9-13, 1986, pp. 294-298.
Software News, "The Promise of LANS: MIS Back in Control", pp. 51-54, 56-58.
IBM Technical Disclosure Bulletin, "Device/Profile Installation Procedure with Validation", vol. 28, No. 4, Sep. 1985, p. 1487.
The DEC Professional, "PACS Plus Relief for VAX/VMS Resource Management Headaches", Feb. 1986, pp. 58-62, 64.
Software News, "LAN Applications Prices Are Not Easy to Set", Apr. 1987, pp. 54, 56, 58.
SIGUCCS Newsletter, "Licensing of Microcomputer Software", vol. 15, No. 4, Winter 1985, pp. 9-12.
AMC-SIGUCCS User Services Conference IX, "A Software Management System", Atlanta, Ga., Oct. 11-14, 1981, pp. 9-17.
Brooks, C., "Experiences with Electronic Software Distribution", USENIX Summer Conference, Portland, Oregon, Jun. 11-14, 1985, pp. 433-436.
Leiss, E., "On Authorization Systems with Grantor-Controlled Propagation of Privileges", CompCon 83, San Francisco, CA, Feb. 28-Mar. 3, 1983, pp. 499-502.
Houy, T., "The Challenge of Selling Software on the Internet", Electronic Software Distribution: White Paper, http://www.elan.com/corp/esd.htm, Nov. 4, 1997, pp. 1-6.
IFOR/LS and EZ-LoK FAQ Product Information, http://www.gradient.com/support/techfaq/ifor/ezlok/ezprod.htm, Nov. 7, 1997, pp. 1-3.
Harper, Jr., R., "Software Licensing For Installations With Multiple Microcomputers", Abstract No. C86000243, Computers & Education, 1985, vol. 9, No. 3, 1 page.
Cooper, F. et al., "Software Protection and Pricing in a LAN Environment", Abstract No. C86032120, Jurimetrics Journal, Winter 1986, vol. 26, No. 2, 1 page.
Rainbow Technologies, "Sentinel License Manager—Getting Started—for Windows TCP/IP and Novell NetWare—Release 5.0", 1997, pp. i-v, 1-24.
Rainbow Technologies, Notice for SentinelLM 5.0 UNIX Customers, 1997, 1 page.
Rainbow Technologies, "Sentinel License Manager—Integrator's Guide for NetWare—Release 5.0", 1997, pp. i-vi to IN-10.
Rainbow Technologies, "Sentinel License Manager—System Administrator's Guide for NetWare—Release 5.0", 1997, pp. i-1 to IN3.
Rainbow Technologies, "Sentinel License Manager—Reference Manual—Release 5.0", 1997, pp. i-1 to IN12.
Rainbow Technologies, "Sentinel License Manager—Integrator's Guide for UNIX—Release 5.0", 1997, pp. i-1 to IN10.
Rainbow Technologies, "Sentinel License Manager—System Administrator's Guide for INIX—5.0", 1997, pp. i-1 to IN4.
Rainbow Technologies, "Sentinel License Manager—Integrator's Guide for Windows TCP/IP—Release 5.0", 1997, pp. i-1 to IN12.
Rainbow Technologies, "Sentinel License Manager—System Administrator's Guide for Windows TCP/IP— Release 5.0", 1997, pp. i-1 to IN3.
Rainbow Technologies, "Sentinel License Manager—Integration Guide—Release 6.0", 1998, pp. i to 130.
Rainbow Technologies, "Sentinel License Manager—Programmer's Reference Manual—Release 6.0", 1998, pp. i to 187.
Rainbow Technologies, "Sentinel License Manager—System Administrator's Guide—Release 6.0", 1998, pp. i to 62.
Rainbow Technologies, "Notice for SentinelLM 6.0 UNIX Customers", Mar. 6, 1998, pp. 1, 2.
Rainbow Technologies, "SentinelLM License Management System, Release 6.1, Release Notes", Jan. 15, 1999, pp. 1-7.
Rainbow Technologies, "Sentinel Engineering Product Release Notes, SentinelLM License Management System", Version No. 6.1, Aug. 13, 1998, pp. 1-7.
Rainbow Technologies, "Notice for SentinelLM 6.1 UNIX Customers", Sep. 18, 1998, pp. 1, 2.
Rainbow Technologies, "SentinelLM License Manager, System Administrator's Guide, Release 6.1", 1998, pp. i-61.
Rainbow Technologies, "SentinelLM License Manager, Developer's Integration Guide, Release 6.1", 1998, pp. i-164.
Rainbow Technologies, "SentinelLM License Manager, Evaluation Guide, Release 6.1", 1998, pp. i-23.
Rainbow Technologies, "SentinelLM License Manager, Programmer's Reference Manual, Release 6.1", 1998, pp. i-191.
Rainbow Technologies, "SentinelLM License Manager, SentinelLM Developer's Guide, Release 6.1", 1998, pp. i-127.
Rainbow Technologies, "Notice for SentinelLM UNIX Customers: Installing from CD", Feb. 26, 1999, pp. 1, 2.
Rainbow Technologies, SentinelLM License Management System, Release 6.2, Release Notes, Feb. 12, 1999, pp. 1-11.
Rainbow Technologies, "Notice for SentinelLM 6.1 UNIX Tandem Customers", Feb. 16, 1999, pp. 1, 2.
Rainbow Technologies, "Notice for SentinelLM 6.1 UNIX Customers", Sep. 23, 1998, pp. 1, 2.
Elan Computer Group, "Comparing Elan License Manager with other software license managers", White Paper, Jun. 15, 1995, pp. 1-5.
Elan Computer Group, "Elan License Manager, Questions and Answers", Aug. 1995, G 0002556-0002562, pp. 1-6.
Elan Computer Group, "Elan License Manager, Technical Overview", Jul. 1995, G 0002546-0002555, pp. 1-9.

Elan Computer Group, "Elan License Manager, Integrator's Guide for Windows, Release 5.0", rev. Jan. 31, 1997, ELAN 002589-002597, pp. i-viii.

Elan Computer Group, "Elan License Manager; System Administrator's Guide for Windows, Release 5.0", rev. Jan. 31, 1997, ELAN 002598-002602, pp. i-iv.

Elan Computer Group, "Elan License Manager, Reference Manual, Release 5.0", rev. Jan. 31, 1997, elan 002603-002609, pp. i-vi.

Common Licensing API, "License Service Application Programming Interface, API Specification v1.02", Jan. 28, 1993, RTI 3389-3413- pp. i-22.

Auto-Trol Technology Corp., "Auto-Trol Software Protection Installation Guide", Apr. 4, 1986, FF00016-00025, 10 pages.

Elan Computer Group, Elan License Manager Technical Overview, Nov. 13, 1997, ELAN 001702-001757, pp. 1-9, 1-2, i-iii, 1-44.

Highland Software, Inc., "FLEXlm End User/Programmers Manual", Mar. 8, 1991, BP 00022-BP 00037, pp. 1-3, 9-11, 19-21, A1-A3, 45, 61, 62, 84, 85.

Auto-Trol Technology Corp., "FLEXlm Programmers Guide, Dec. 1994", BP 00098-000137, pp. 1-36, 1-4.

Highland Software, Inc., "FLEXlm License Manager, Technical Overview", Oct. 1991, 8 pages.

Globetrotter Software, Inc., FLEXlm Programmers Guide for Windows, Version 5.11, Mar. 1997, RTI 5219-5290, pp. i-65.

Globetrotter Software, Inc., FLEXlm End User Manual, Version 6.0, Oct. 1997, RTI5129-5217, pp. 1-80.

Globetrotter Software, Inc., FLEXlm Reference Manual, Version 6.0, Dec. 1997, RTI5291-5508, pp. i-206.

Globetrotter Software, Inc., FLEXlm Reference Manual, Version 6.1, Jan. 21, 1999, RTI5509-5942.

* cited by examiner

LICENSE MANAGEMENT SYSTEM AND METHOD WITH LICENSE BALANCING

CROSS-REFERENCE TO RELATED APPLICATIONS

Embodiments of the present invention claim priority from Provisional Application Ser. No. 60/152,785, filed Sep. 3, 1999, and are related to U.S. utility patent applications entitled "License Management System And Method With Multiple License Servers" Ser. No. 09/648,697, filed Aug. 25, 2000, now U.S. Pat. No. 7,035,918; "System and Method For Selecting A Server In A Multiple Server License Management System" Ser. No. 09/648,853, filed Aug. 25, 2000, now U.S. Pat. No. 6,842,896; and "License Management System And Method For Commuter Licensing" Ser. No. 09/648,502, filed Aug. 25, 2000, now U.S. Pat. No. 6,968,384. The contents of each of these applications are incorporated by reference herein.

BACKGROUND OF THE INVENTION

1. Field of the Invention

The present invention relates, generally, to license management systems and processes for managing licenses on a computer network and, in preferred embodiments, to such systems and processes involving a pool of license servers for managing software licenses among one or more users on the network, and for balancing the management load among the servers in the pool.

2. Description of Related Art

The increasing popularity of computer usage in homes and businesses, as well as in governmental, research and education institutions, has brought about a world-wide demand for greater software variety and sophistication. Indeed, the software development industry in most industrialized countries has shown substantial growth in recent years and is expected to show continued growth through the next decade.

However, as software sophistication increases, development costs associated with such software also tend to increase. Modern software programs can require months or even years of development, often involving expensive resources and teams of highly skilled engineers and programmers, before a product may be readied for sale or license. Thus, software development companies are often required to make large investments early in the development of their products, in the hope that the products will provide a volume of sales or license revenues sufficient to cover their development investments and generate profits.

Illegal software usage and piracy have become a significant problem to software development companies. Because of the nature of computer software, illegal usage and illegal copying of proprietary software programs can be difficult to detect or deter. The increasing usage of computer networks has added to the problem. Computer networks can allow multiple users to access and copy software stored by a common network program server or copy and pass software between each other, over the network. A legitimately purchased or licensed copy of a software program available on a network could result in many illegitimate usages or copies by unauthorized or unlicensed users having access to the network.

Various forms of encryption techniques have been developed to inhibit usage of encrypted software by unauthorized users that do not possess a decryption program or key. However, such techniques typically require each authorized users to obtain or be passed a decryption program or key, in advance of usage of the encrypted program. Accordingly, such techniques can be prohibitively inconvenient for some computer and network environments, where it is difficult or impractical to supply each authorized user with a decryption program or key or to decrypt a program for each user or usage.

Other software protection techniques have required legitimate or authorized users to have a special hardware device or circuit installed in or plugged into their computer, prior to usage of the protected software. See, e.g., U.S. Pat. No. 4,446,519 to Thomas. Again, such techniques can be prohibitively inconvenient for some computer and network environments. For example, if the network environment is such that the authorized user must use multiple computers on the network, then each computer must be provided with the special hardware device. Moreover, if the environment is such that computers having the special hardware device are not located in secure facilities, then unauthorized users may be able to access the protected software by using the non-secure computer in which the special hardware device is installed.

Accordingly, more sophisticated license management software has been developed for managing software licenses for computer networks, which do not require encryption of the protected software or special hardware devices in each authorized user's computer. For example, the assignee of the present invention, Rainbow Technologies, Inc., has marketed versions of a license management system under the trademark, SENTINELLM™. The SENTINELLM™ systems operate with a license server connected to a network of users. The license server stores and manages software licenses for the network users, in accordance with a license management program stored on the server. Each copy of a protected software program on the network is accompanied by a program code corresponding to a shell (also known as "wrapper") or library of Application Program Interface (API) functions, which communicates with the license management program on the server. When a user starts to run the protected software program, the shell code or library of API functions provided with the program communicates a request to use a license to the license server, over the network. The server, under the control of the license management software, responds to the request to determine whether it is storing an available license for the protected software program. If so, the server communicates an authorization message to the user and decrements a count of available licenses stored by the server. If not, the server communicates another message to the user, indicating that no licenses are available. In this manner, licenses are always stored and managed on a network license server. Each network user may have a copy of a protected software program, but must communicate with the license server for authorization to use the protected program.

License management systems which employ a license server, as discussed above, provide significant advantages with respect to the freedom to readily add, delete or change authorized users on the network, and the ability to readily control and alter licensing schemes (for example, to add or delete licenses or change conditions for licenses) by modifying only the license server files or programs. However, if all licenses are stored and managed in a single license server, failure of that server can result in a failure of the entire license management system. Accordingly, prior versions of the SENTINELLM™ systems include multiple license server capabilities, wherein two or more license servers are provided on the network, each having a pre-loaded license file and a license management program. One of the servers may be designated as a primary license server, while the others are designated as backup servers. If the primary server cannot be reached by a user, for example, because the primary server has crashed or otherwise gone down, the user may then communicate with a backup server to obtain an authorization message. The backup server, having a pre-loaded copy of the license file and the license management program, may then take over the license management functions.

Alternatively, in other prior versions of SENTINELLM™ systems, a shell program or library of API functions could be configured to send a general poll to all servers coupled to the communication channel on which the poll is sent. In response to a general poll, any server computer having a license file containing license information corresponding to the protected software program (whether or not the license information indicated that a license is available) would send a reply to the requesting client computer. The shell program or library of API functions associated with the requesting client computer would then respond to the first reply received from a license server having a license file storing license information for the protected software program. If the replying license server contains an available license for the protected software program, the replying license server provides an authorization message to the requesting client computer. If the replying license server does not contain an available license for the protected software program, the replying license server provides a message to the requesting client computer indicating that authorization to run the protected software program has not been granted. Such a system provides a degree of protection against system failure, in the event that one of the license servers crashes or goes down. The down server computer would not respond to the poll, but other server computers having appropriate license information in their license file would respond to the poll, thus, allowing the client computer to continue to seek authorization to run the protected software program, even though one of the servers was down.

While the above SENTINELLM™ systems have operated well in many contexts, each license server operates somewhat independent of other license servers. Accordingly, there is a need in the industry for improvements in connection with management and coordination of multiple license servers (or a pool of license servers) in software license management systems for computer networks.

SUMMARY OF THE DISCLOSURE

Therefore, it is an advantage of embodiments of the present invention to provide a license management system and method for managing licenses on a network using multiple license servers that allows allocations to be distributed among the license servers and then re-assigned between license servers by updating the distribution tables of the license servers to facilitate a dynamic balancing of allocations among license servers based on actual or expected usage.

It is a further advantage of embodiments of the present invention to provide a system and method for managing licenses on a network using multiple license servers that allows allocations to be re-assigned from a nonfunctional (down) license server to a functioning license server by updating the distribution table of the functioning license server to facilitate a dynamic balancing of allocations among license servers based on actual or expected usage.

It is a further advantage of embodiments of the present invention to provide a system and method for managing licenses on a network using multiple license servers that allows a network administrator to change the initial distribution of allocations, add allocations, or add license codes for protected software.

These and other advantages are accomplished according to a system for balancing a distribution of allocations for protected software over a communication network. The system is comprised of at least one client computer and a pool of license servers coupled to the communication network. The client computers request authorizations to use the protected software, while a distribution of allocations is managed among the pool of servers for tracking and managing available allocations for using the protected software. One license server in the pool is designated as the current leader server. When a particular license server does not have a selectable minimum amount of available allocations, the current leader server re-assigns, where possible, the allocations within the pool by updating the distribution tables of license servers in the pool, to give at least one additional allocation to the particular license server.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Preferred embodiments of the invention relate to a system and process involving a pool of license servers for managing licenses to, for example, one or more protected software programs, files or other data structures, among one or more users on the network. Protected software may include, but is not limited to, for example, a software program, such as a word-processing program, a graphics program, a computer game, etc., a proprietary file or other data structure, such as a data-base or other form of data, as well as other software encoded information or instructions, for which the control of user access is desired. For purposes of simplifying the present disclosure, the protected software used in the following examples is one or more proprietary software programs.

According to a preferred embodiment of the present invention, the plurality of license servers are managed in accordance with a server pool scheme, as controlled by a license management program associated with each license server computer and the shell program or library of API functions associated with each copy of the protected software program. In preferred embodiments, the pool of license servers comprises three to 11 servers. However, it should be noted that alternative embodiments of the present invention are not limited to any particular maximum number of license servers. In addition, in further alternative embodiments, multiple pools of license servers can reside on a single network. However, for purposes of illustration only, embodiments of the present invention will be described herein with reference to a pool of three license servers.

Figure 1:
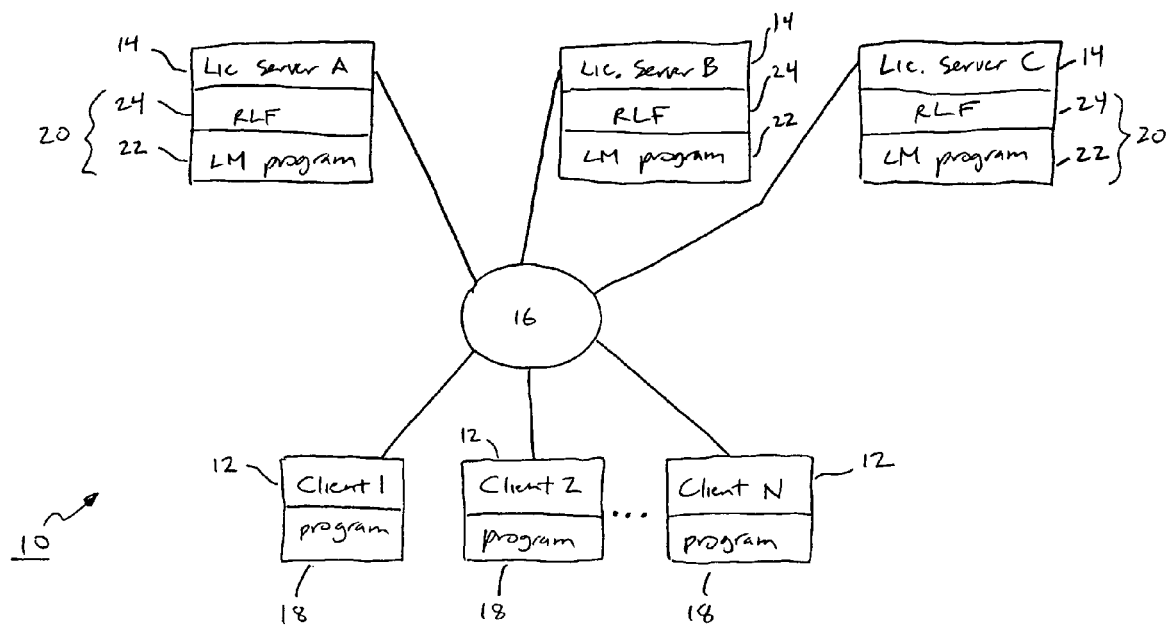
FIG. 1 is a generalized block diagram representation of an example network environment according to an embodiment of the present invention.

An example hardware environment for an embodiment of the present invention is illustrated, generally, in FIG. 1. With reference to FIG. 1, a computer network 10 includes a plurality of user or client computers 12 and three license servers 14, each coupled for communication over a communication network link, generally referenced at 16. The plurality of client computers 12 are identified as "Client 1", "Client 2", and "Client N", and the plurality of license servers 14 are labeled as "Lic. Server A", "Lic. Server B", and "Lic. Server C." Embodiments may employ any suitable number of client computers 12 and any suitable number of license servers 14.

Also, while not shown in FIG. 1, the network 10 may include additional components, including one or more program or file servers, routers and/or other well known network devices and resources.

Each client computer 12 preferably includes a suitable processor and associated transient memory, such as an RAM, for running a protected software program. The client computer may be part of a standard personal computer (PC), network terminal, workstation or the like. In one preferred embodiment, each client computer 12 is coupled to a persistent program storage memory device 18, which may include, but is not limited to, a hard disc drive, floppy disc drive, tape drive, CD-ROM or the like, having a computer readable medium on which the protected software program is stored. Also stored as part of the protected software program is additional program code, such as code corresponding to a shell or library of API functions as discussed above, for communicating with the server computers which are under control of a license management program, in accordance with communication functions discussed below.

Each license server 14 preferably includes a suitable processor and associated transient memory, such as an RAM, for running a license management program as described herein. In addition, each license server 14 is coupled to one or more persistent program storage memory devices 20, which may include, but is not limited to, a hard disc drive, floppy disc drive, tape drive, CD-ROM or the like, having a computer readable medium on which a license management program 22 and a redundant license file (RLF) 24 are stored.

Figure 2:
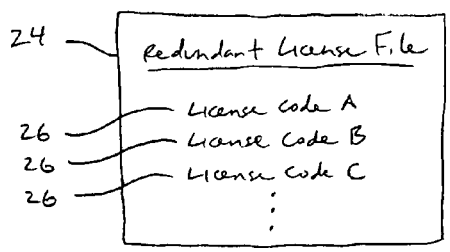
FIG. 2 is a generalized representation of a redundant license file (RLF) for the network environment of FIG. 1 according to an embodiment of the present invention.

An example embodiment of an RLF 24 is shown in FIG. 2 as containing license codes 26 for proprietary software programs A, B, C, etc. Each license code 26, in one example embodiment, comprises a string of data relating to license policy and the software program to which the license policy applies. In preferred embodiments, license codes 26 for software produced by more than one vendor may reside within the same RLF 24 of the same license server 14, and may be managed with a single process (execution of the license management software) running on a single license server 14. Thus, any given licenser server 14 does not need to have multiple license management processes running to manage licenses for multiple protected vendor applications. Instead, only one license management program needs to be running on a given license server 14, to manage licenses for protected vendor applications managed by that license server.

Figure 3:
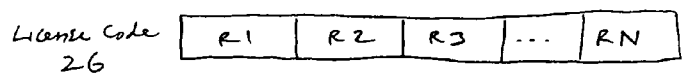
FIG. 3 is a generalized representation of a license code contained in an RLF of FIG. 2 according to an embodiment of the present invention.

In the example embodiment of FIG. 3, a license code 26 comprises a data string defining multiple records or fields R1, R2, R3 . . . RN, wherein each record corresponds to an attribute associated with the license policy, the software program to which the license policy applies, or other information. In preferred embodiments, each license code 26 includes at least one attribute associated with a license policy, the number of allocations for using the protected software program, and at least one other attribute associated with the identity of the protected software program. The number of allocations for using the protected software program is the maximum number of users that can be running the protected software program at any one time, and is also referred to as the ceiling or hard limit. Data associated with a license policy preferably includes data representing the expiration date or expiration time of the license, as granted by the licensee (e.g., the protected software program's owner or developer).

Figure 4:
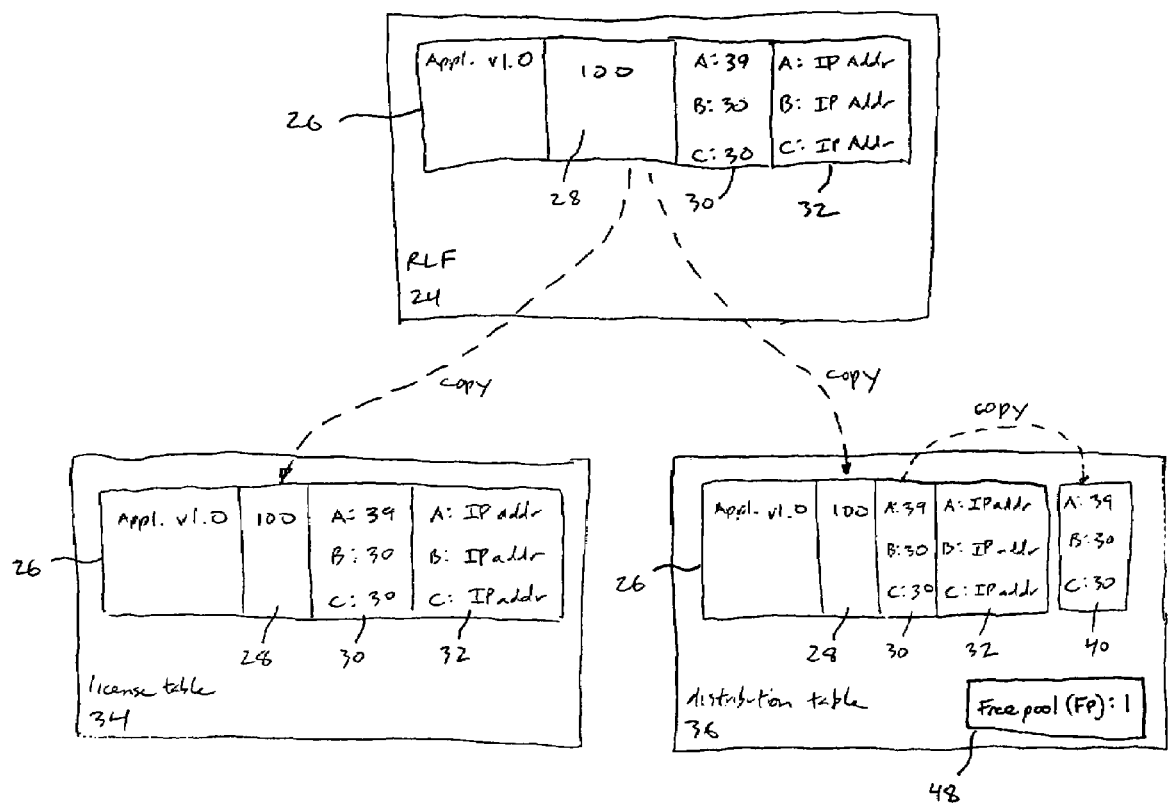
FIG. 4 is a generalized representation of a license code contained in an RLF and copied into a license table and a distribution table within a single license server for the network environment of FIG. 1 according to an embodiment of the present invention.

For purposes of illustration only, in the example of FIG. 4 only one fictional license code 26, identified as "Application v1.0," is stored in the RLF 24 of a license server 14, with a hard limit of 100 total allocations distributable across all license servers 14 (see reference character 28). In preferred embodiments, another attribute of the RLF 24 is the IP address 32 for each license server 26. Another attribute of the RLF 24 is the distribution of the 100 allocations across all the license servers 14. This distribution is identified as the initial distribution 30, and is configurable by the network administrator. In the example of FIG. 4, an initial distribution 30 of A:39, B:30, C:30, indicates that 39 allocations will initially be assigned to license server A, 30 allocations will initially be assigned to license server B, and 30 allocations will initially be assigned to license server C. This initial distribution 30 also signifies that the pool will comprise three license servers.

In preferred embodiments of the present invention, each RLF 24 stored in each license server 14 is an exact copy of every other RLF 24 of license servers in the pool. Thus, attributes of the license code 26 such as the expiration date or number of allocations need not be passed between license servers 14 in response to a request for authorization to used a protected software program from a client computer 12, because an exact copy of the license code 26 has already been stored on the hard disk of each license server 14 prior to the startup of that license server 14.

Each license server 14 operates, under the control of its associated license management program 22, to perform license management functions in association with data contained in the RLF 24, as described herein. Thus, when a particular license server 14 is started, the license server 14 loads the contents of its RLF 24 into a license table 34 in RAM or other memory and reads the license table 34, which identifies that server as a license server 14. It should be noted that in preferred embodiments, the license table 34 is never modified. In addition, the contents of the RLF 24 is loaded into a distribution table 36 in RAM or other memory, and the initial distribution 30 is further copied into another record, distinct from the license code 26, identified as a current distribution 40. Unlike the license table 34, the distribution table 36 changes its current distribution 40 over time, to keep track of current allocations.

It should be noted that in the example of FIG. 4, only 99 of the 100 allocations have been initially assigned by the network administrator. If the network administrator makes an initial distribution that does not equal the hard limit of allocations (see reference character 28), in preferred embodiments of the present invention the extra allocations will be put into a free pool 48 maintained within the distribution table 36. Thus, in the example of FIG. 4, one allocation is put into free pool 48. If, on the other hand, the network administrator makes no initial distribution 30 of allocations in the RLF 24, preferred embodiments will divide the allocations evenly over the number of servers in the pool, and any extras will be put in the free pool 48. For example (but not illustrated in FIG. 4), if no initial distribution 30 was assigned by the network administrator, information representing an even distribution of A:33, B:33, and C:33 would be stored in the initial distribution attribute 30 of the RLF 24, and when a particular license server 14 is started, the RLF 24 would load an even distribution of A:33, B:33, and C:33 into the current distribution attribute 40 of distribution table 36, and would load a value of one into the free pool 48.

Figure 5:
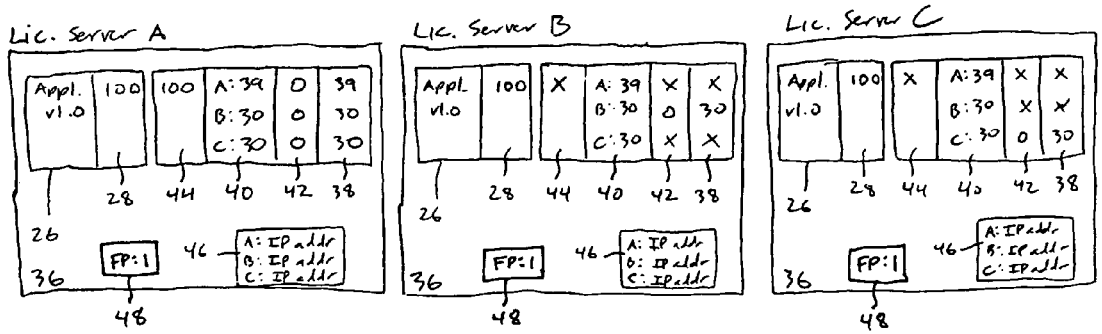
FIG. 5 is a generalized representation of an initial state of distribution tables of leader server A and follower servers B and C in a server pool comprising three license servers according to an embodiment of the present invention.

For purposes of illustration only, FIG. 5 illustrates an example of the distribution tables 36 for a three server pool consisting of license servers A, B, and C. Assume, for this illustration, that all three license servers have been started up, and that license server A has been designated as the leader server, and B and C as the follower servers. Further assume that the hard limit of allocations for the software program Application v1.0 is 100, as indicated by the hard limit record 28 associated with the license code 26 for Application v1.0 within each distribution table 36. In addition, assume that the current distribution of allocations is 39 on leader server A, 30 on follower server B, 30 on follower server C, and one in the free pool, as indicated in the current distribution record 40 and the free pool 48 associated with the license code 26 for Application v1.0 within each distribution table 36.

Note also that in the embodiment of FIG. 5, associated with each license code 26 is a record for available allocations for each server in the pool (see reference character 38), a record for available allocations for all servers in the pool (see reference character 44), and a record for allocations currently in use for each server in the pool (see reference character 42). The allocations in these records are values which are incremented or decremented as authorizations are issued, returned, or borrowed. It should be understood that the records identified by reference characters 28, 38, 40, 42, and 44 in FIG. 5 are associated with a particular license code 26, but are distinct from it.

As indicated in FIG. 5, in preferred embodiments of the present invention, the structure of the distribution tables 36 will be the same for both the leader server A and follower servers B and C, but only the distribution table 36 for leader server A (the leader distribution table) will reflect the allocation status of the other license servers 14 in the server pool. In contrast, the distribution tables 36 for follower servers B and C (the follower distribution tables) will only reflect the allocation status of that particular follower server, as indicated by the X (don't care) designations in portions of the follower distribution tables.

When a user at a client computer 12 desires to run Application v1.0 from a follower server, such as follower server B, for example, the client computer 12 may first load some or all of the protected program into the transient memory of the client computer 12, along with the program code corresponding to a shell or library of API functions. Alternatively, the protected program may remain in persistent memory 18 until and unless the server computer communicates an authorization signal to the shell program or library of API functions. Selection of a follower server from which to request authorization is described in a related U.S. utility application Ser. No. 09/648,853 entitled "System and Method for Selecting a Server in a Multiple Server License Management System," filed Aug. 25, 2000, the contents of which are incorporated by reference herein. Alternatively, the protected program may remain in persistent memory 18 until and unless the server computer communicates an authorization signal to the shell program or library of API functions. Loading of the shell program or library of API functions is preferably transparent to the user on the client computer 12 and, preferably, occurs in response to the user inputting a command to open the protected software (for example, by clicking a mouse button on an icon associated with the protected software).

Figure 6:
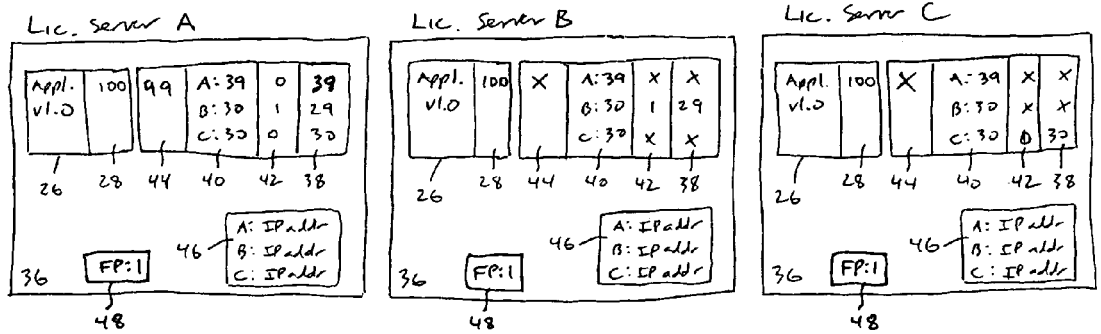
FIG. 6 is a generalized representation of distribution tables of leader server A and follower servers B and C in a server pool comprising three license servers in the example of FIG. 5 after an authorization has been granted by follower server B according to an embodiment of the present invention.

As part of the function of the shell or library of API functions, a request is then sent from the client computer 12 to follower server B for one or more authorizations to run the protected program. For purposes of this example, assume that client computer 12 requested only one authorization. Follower server B, under the control of the license management software, responds to the request by looking at its distribution table 36 to determine whether it has available allocations for Application v1.0. In the example of FIG. 5, follower server B has 30 allocations available, as represented by the available allocations record for each server in the pool (reference character 38) in the distribution table 36 for follower server B. Because it has available allocations, follower server B communicates an authorization message to the client computer 12. As illustrated in FIG. 6, once the authorization message is sent, the distribution table 36 is updated so that the available allocations record 38 for follower server B decreases to 29, and the allocations in use record 42 for follower server B increases to one.

As noted above, in preferred embodiments of the present invention the leader server always has a global picture of the distribution of allocations in the whole server pool. Thus, in the present example any changes to the distribution table of follower server B must be communicated to leader server A. In preferred embodiments, follower server B can determine the IP address for the leader server A from a leader priority list 46, which is configurable by the network administrator. It should be noted that in preferred embodiments, the IP address of all license servers 14 in the server pool are stored in the leader priority list 46, a data structure separate from the license codes 26, to facilitate faster lookup. However, in alternative embodiments the IP addresses may be stored in a record associated with the license codes 26. In any case, after determining the IP address of the leader server A, follower server B communicates the fact that its available allocations count has dropped to 29 to leader server A, and the distribution table of leader server A will be updated accordingly. Thus, as illustrated in FIG. 6, the distribution table 36 of leader server A reflects that the available allocations record 38 for follower server B has dropped to 29, the allocations in use record 42 for follower server B has increased to 1, and that the record for allocations available for all servers in the pool (see reference character 44) has dropped to 99.

Dynamic license balancing will be described next according to embodiments of the present invention. In preferred embodiments, license server 14 stores a value for a borrowing threshold that can be set, for example, by the network administrator. Fundamentally, the borrowing threshold is an indicator that the number of available allocations for a particular protected software program assigned to a particular license server 14 has reached an unacceptably low level. The network administrator can independently set the borrowing threshold for each license server 14 such that borrowing, or license balancing, may be enabled when a certain percentage of the allocations assigned to a particular license server 14 are in use. In preferred embodiments of the present invention the borrowing threshold can be set to a value of between 1% and 90%. However, in alternative embodiments, the borrowing threshold can be set to as high as 100%.

Figure 7:
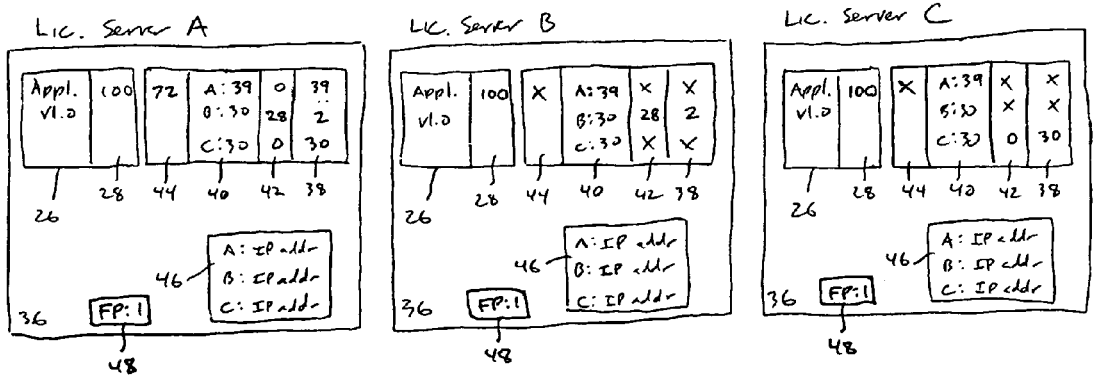
FIG. 7 is a generalized representation of distribution tables of leader server A and follower servers B and C in a server pool comprising three license servers in the example of FIG. 5 after 28 authorizations have been granted by follower server B according to an embodiment of the present invention.

Generally, any time the borrowing threshold is exceeded, a borrow request to the leader server will be initiated. Continuing the example of FIG. 6 for purposes of illustration only, assume that the borrowing threshold has been set to 90%, and a cluster of client computers 12 have requested 27 more authorizations for Application v1.0 from follower server B. As illustrated in FIG. 7, once the authorization messages have been sent by follower server B, the available allocations record 38 for follower server B decreases to two, and the allocations in use record 42 for follower server B increases to 28. This change is then communicated to leader server A, whose distribution table 36 will reflect that the available allocations record 38 for follower server B has decreased to two, the allocations in use record 42 for follower server B has increased to 28, and that the record for allocations available for all servers in the pool (see reference character 44) has decreased to 72. It should be noted in FIG. 7 that the distribution tables 36 for follower servers B and C keep track of changes to their own allocations, but do not keep track of changes to the allocations of other license servers. At this point in time, greater than 90% of the allocations for follower server B are in use. Because the borrowing threshold of 90% has been exceeded, follower server B will then initiate a borrow request.

In preferred embodiments of the present invention, borrowing always occurs through the leader server because the leader server always maintains a complete picture of the current distribution of allocations within the server pool. However, before a borrow request can be processed, the number of allocations to be borrowed must be determined. In preferred embodiments, the number of allocations to be borrowed is dependent on (1) the number of allocations needed to drop below the borrowing threshold, and (2) the borrowing threshold itself. Generally, the number of allocations to be borrowed is equivalent to the number of allocations needed to drop below the borrowing threshold, plus a number of extra allocations inversely related to the borrowing threshold. If the borrowing threshold is generally lower, it may be exceeded more frequently, and thus the number of extra allocations is set higher. If the borrowing threshold is generally higher, it may be exceeded less frequently, and thus the number of extra allocations is set lower.

In the example of FIG. 7, follower server B will determine that, with 28 allocations in use, two available allocations are needed to drop below the borrowing threshold. (If only one available allocation was borrowed, for a total allocation of 31, then 28÷31=90.3%, which still exceeds the borrowing threshold of 90%. However, if two available allocations are borrowed, for a total allocation of 32, then 28÷32=87.5%, and the borrowing threshold is not exceeded.) Moreover, because the borrowing threshold of 90% is relatively high and may be exceeded less frequently, no extra allocations will be borrowed. Thus, in the example of FIG. 7, assume that a total of two allocations will be borrowed.

When leader server A receives the borrow request from follower server B, in preferred embodiments of the present invention leader server A looks within its own memory—first at the free pool 48, then to the allocation of any down license servers, and finally to its own current allocation—to locate an available allocation. However, in alternative embodiments, other sequences may be employed. In the example of FIG. 7, leader server A will determine that one allocation is available from the free pool 48, no license servers 14 are down, and that one allocation is available from the current allocation of leader server A. Leader server A will then borrow (re-assign) one allocation each from free pool 48 and leader server A to follower server B.

Figure 8:
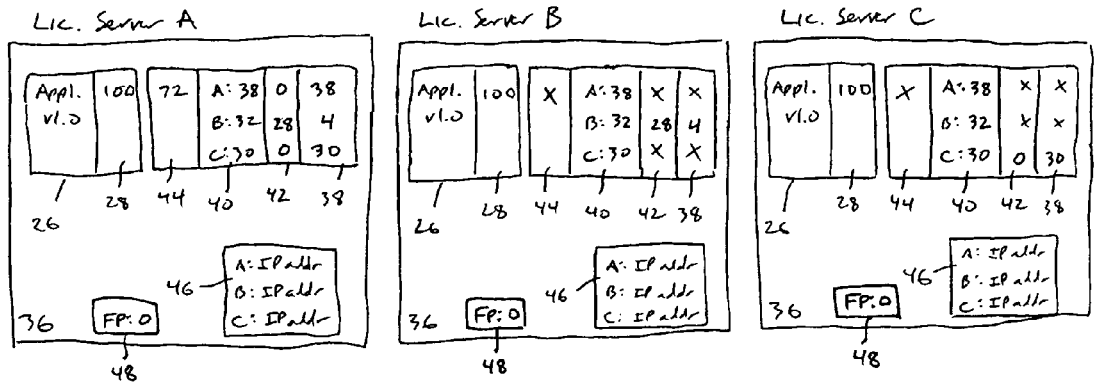
FIG. 8 is a generalized representation of distribution tables of leader server A and follower servers B and C in a server pool comprising three license servers in the example of FIG. 7 after client computer B has requested an authorization from follower server B, one allocation has been re-assigned to follower server B from leader server A, and one allocation has been re-assigned to follower server B from the free pool according to an embodiment of the present invention.

As illustrated in FIG. 8, after the borrowing has occurred, the distribution table 36 for leader server A will reflect the re-assignment of allocations caused by the borrowing. In the distribution table for leader server A, the current distribution 40 of leader server A has changed to A:38, B:32, C:30, the available allocations record 38 for follower server B has increased to four, and the free pool 48 for leader server A has decreased to zero.

In preferred embodiments of the present invention, after the distribution table 36 for leader server A has been updated, leader server A sends a distribution criteria sync message to follower servers B and C to change their distribution tables 36. As illustrated in FIG. 8, after the distribution criteria sync message has been received by follower servers B and C, the distribution table 36 for follower server B reflects the new current distribution 40 of A:38, B:32, C:30, and a new available allocations record 38 of four. The distribution table 36 for follower server C also reflects the new current distribution 40 of A:38, B:32, C:30. It should be noted that even though a successful borrow request will change the assignment of allocations within the server pool, the initial distribution 30 in the RLFs 24 and license tables 34 (see FIG. 4) do not change.

In the example of FIG. 7, the leader server A was able to borrow (re-assign) one allocation each from free pool 48 and leader server A to follower server B. However, if an insufficient number of available allocations were available from free pool 48 and leader server A, leader server A will send a borrow request to follower server C on behalf of follower server B, while saving the original borrow request from follower server B. If follower server C has available allocations, leader server A will decrement the number of allocations in follower server C by the appropriate amount, and increment the number of allocations in follower server B by the same amount. After the distribution table 36 for leader server A is updated, leader server A will send a distribution criteria sync message to follower servers B and C to change their distribution tables 36. However, if follower server C does not have a sufficient number of available allocations, it will decline the borrow request from leader server A. Leader server A will then send a borrow response back to follower server B, indicating that no authorizations could be granted.

Because the borrowing process may take a relatively long time, it is possible that while a server is in the process of borrowing allocations, but before any allocations have actually been re-assigned, a new request from another client computer for one or more authorizations may be received. In preferred embodiments of the present invention, the affected server will examine its distribution table, and even though the borrowing threshold is currently exceeded, will grant authorizations to the requesting client computer if there are enough allocations available to satisfy the entire request. However, if there are an insufficient number of available allocations to satisfy the entire request, the affected server will send a denial message back to the requesting client computer.

In preferred embodiments of the present invention, because the re-assignment of allocations in the distribution tables 36 of the license servers 14 as a result of a borrow request is not reversed when the re-assignment of allocations is no longer needed, borrowing has the result of dynamically altering the distribution of allocations for each license server 14 in the server pool. Thus, license servers 14 that receive a large number of requests for authorizations may eventually accumulate a large number of allocations as compared to license servers 14 that receive fewer requests. In this way, the current distribution of allocations may, over time, settle into a distribution that is optimized for the utilization of the specific network.

However, in addition to the re-assignment of allocations as a result of borrowing, the distribution of allocations may also be changed by the network administrator. Although the RLF 24 contains the initial distribution 30, a network administrator may later decide to change the current distribution 40. Preferred embodiments of the present invention provide a utility, triggered by a change distribution criteria message, that enables a leader server to make changes to the current distribution 40 of allocations for the pool of license servers.

Using the example three server pool discussed in FIGS. 5-8 for purposes of illustration only, if the network administrator, using a client computer 12, sends a change distribution criteria message including a new current distribution 40 to follower server B, follower server B will pass this message to leader server A along with the new current distribution 40. As this example illustrates, in preferred embodiments all change distribution criteria messages, if not initially sent to the leader server, must be forwarded to the leader server so that the leader server always has a global picture of the current distribution of allocations 40 in the server pool. In addition, follower server B will send a "message forwarded to leader server" message back to client computer 12.

Once leader server A receives a change distribution criteria message, leader server A will then change its current distribution record 40 in its distribution table 36 and send a distribution criteria sync message to follower servers B and C. Again, it should be noted that a change distribution criteria message will only change the current distribution 40 of the server pool, not the RLFs 24. An advantage of this utility is that a network administrator can use any license server 14 to make the change.

In the case where the network administrator uses a client computer to send a change distribution criteria message directly to the leader server, after the leader server changes the distribution table and a distribution criteria sync message has been sent to the follower servers in the pool, the leader server will send a message back to the client computer indicating that the distribution criteria has changed.

In addition to changing the current distribution of allocations in the server pool, in embodiments of the present invention allocations can also be added to the server pool by the network administrator. Through a client computer, for example, the network administrator can run a utility that requests the addition of allocations to an existing license code by adding a "new" license code. The overall hard limit of the existing license code is thereby increased by the hard limit of the new license code. The new license code should accompany a distribution criteria specifying a desired allocation for each server in the pool. If no distribution criteria is specified, the allocation is equally divided among the servers in the pool, with any remainder being placed in the free pool.

If the add allocations message is directed to a follower server, the follower server will forward the message to the leader server. Thus, an advantage of this utility is that a network administrator can use any license server to make the change. Once the leader server receives an add allocations message, the leader server will then change its hard limit of allocations record for the proper license code in its distribution table and send a distribution criteria sync message to the follower servers. Once the hard limit of allocations record has been changed in all license servers, the leader server will send a message back to the client computer through the follower server (but only if the add allocations message was initially sent to the follower server) indicating that the hard limit of allocations has been changed. Again, it should be noted that an add allocations message will only change the hard limit of allocations in the server pool, not the RLFs.

In embodiments of the present invention a new license code 26 can be added to the server pool by the network administrator. Through a client, the network administrator can run a utility that requests the addition of a new license code 26 to a particular license server. Using the example three server pool discussed in FIGS. 5-8 for purposes of illustration only, if the network administrator, using a client computer 12, sends an add license code message to follower server B, follower server B will pass this message to leader server A along with the new license code 26. As this example illustrates, in preferred embodiments all add license code messages, if not initially sent to the leader server, must be forwarded to the leader server so that the leader server always has a global picture of the license codes 26 in the server pool.

Once leader server A receives an add license code message, leader server A will then add the license code 26 to its distribution table 36 and send a distribution criteria sync message to follower servers B and C. Once the license code 26 has been added to the distribution table 36 of all license servers 14, leader server A sends a message back to the client computer 12 through follower server B (only if the add license code message was initially sent to follower server B) indicating that the license code has been added. Again, it should be noted that an add license code message will only add the license code 26 to the distribution tables 36 of license servers 14 in the server pool, not the RLFs 24. In addition, an add allocations message must be separately sent to add allocations to the new license code 26. An advantage of this utility is that a network administrator can use any license server 14 to make the change.

It should be noted that the discussion hereinabove has been limited to redundant license codes 26, which are defined herein as license codes 26 having allocations that may be re-assigned to any license server 14 in the server pool. However, in preferred embodiments of the present invention, it is also possible to add non-redundant license codes, which are defined herein as license codes that can be run only on a particular server. Thus, one attribute of a license code 26 is whether it is non-redundant. If an add license code message for a non-redundant license code for follower server B is sent to follower server B, for example, the distribution table 36 of follower server B would be updated, but the change would not be forwarded to leader server A. Thus, leader server A would have no knowledge of the existence of the non-redundant license code.

To successfully receive an authorization message to run a program licensed under a non-redundant license code 26 in follower server B, a client computer 12 must request the authorization from follower server B. No other license server 14, including the leader server A, will know of the existence of the non-redundant license code 26. Thus, if a request is made to leader server A or follower server C for the non-redundant license code 26 in follower server B, a denial will be sent back to the client computer 12. No borrow request will be initiated. In addition, if follower server B goes down, the allocations for this non-redundant license code will not be re-assigned to follower server C or leader server A.

Figure 9:
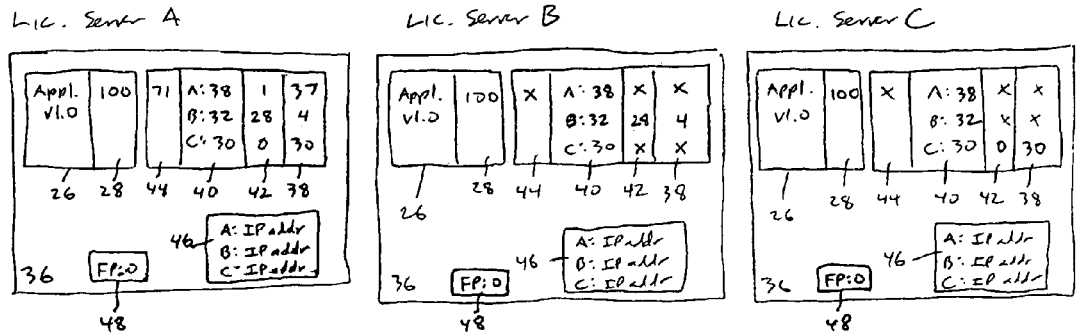
FIG. 9 is a generalized representation of the distribution tables of license servers A, B and C in a server pool comprising three license servers in the example of FIG. 8, after one additional authorization has been granted by leader server A according to an embodiment of the present invention.

Dynamic license balancing after a license server 14 has gone down will be described next according to embodiments of the present invention. Continuing the example of FIG. 8 for purposes of illustration only, assume that a client computer A has requested authorization to use a protected software program and has received an authorization message from leader server A, so that the distribution tables 36 for the three license servers 14 are as illustrated in FIG. 9. In embodiments of the present invention, the license servers 14 periodically communicate with (ping) each other so that license servers 14 know which other license servers 14 are down or up. The communication, or pinging, may be in the form of a periodic signal (heartbeat) sent from the follower servers to the leader server.

Now assume that leader server A goes down. Because all license servers 14 are periodically pinging each other, the two follower servers B and C will soon determine that leader server A has gone down. An election process is then triggered, and a new leader server is elected from among the functioning follower servers. Election of a new leader server is described in a related U.S. utility application Ser. No. 09/468,853 entitled "System and Method for Selecting a Server in a Multiple Server License Management System," filed Aug. 25, 2000, the contents of which are incorporated by reference herein.

Figure 10:
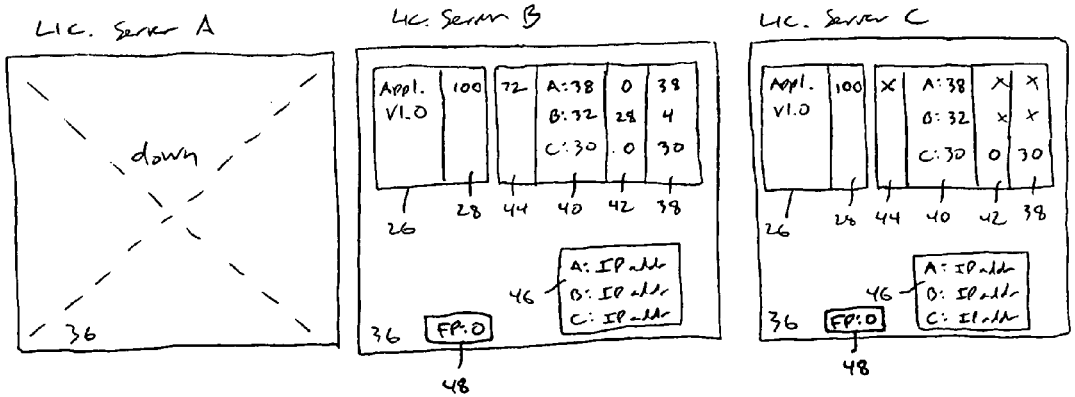
FIG. 10 is a generalized representation of the distribution tables of license servers A, B and C in a server pool comprising three license servers in the example of FIG. 9, after leader server A has gone down and new leader server B has received information on the allocations within all license servers in the server pool according to an embodiment of the present invention.

New leader server B will already have its own RLF 24, license table 34, and distribution table 36, which includes the current distribution of allocations 40. However, new leader server B does not have the global allocation information maintained by the old leader server A. Therefore, upon becoming the new leader server, license server B must now receive this information from the other license servers. As illustrated in FIG. 10, because license server A is now down, within the distribution table 36 for new leader server B, the allocations in use record for license server A (see reference character 42) is set to zero, and the allocations available record (see reference character 38) is set to 38. When new leader server B sends a heartbeat to follower server C, the heartbeat contains information which identifies B as the leader server. Follower server C will send an "ack" in response to the heartbeat from new leader server B, and in the process, will provide information on the allocations in use record and the allocations available record for follower server C. Once this information is received, within the distribution table 36 for new leader server B, the allocations in use record for license server C (see reference character 42) is set to zero, and the allocations available record (see reference character 38) is set to 30. In addition, the record for allocations available for all servers in the pool (see reference character 44) is set to 72. In this manner, new leader server B receives a global picture of the status of all license servers in the server pool.

Meanwhile, because of the periodic communication, or pinging, between client computers 12 connected to a particular license server 14 and that particular license server 14, client computer A will soon determine that leader server A went down. Client computer A knows that it has received authorization to run a protected program from leader server A, and therefore knows that it must enter a fail-over mode and look for a new license server 14 from which to receive authorization. Because client computer A receives leader priority list 46 from a license server 14 whenever client computer A receives an authorization, client computer A knows the IP address of every license server 14 in the server pool. Client computer A then sends a heartbeat to the remaining license servers 14 in turn, in the order designated in leader priority list 46, until it finds a server with an available allocation.

In preferred embodiments of the present invention, each license server 14 maintains a key table containing a list of all client computers 12 that currently have authorizations issued by that license server 14, even for non-redundant license codes. Thus, when new leader server B receives a heartbeat from client computer A, new leader server B will determine from the key table that it did not previously issue an authorization message for client computer A. Thus, new leader server B will convert the heartbeat to a request, and will issue a new authorization message for client computer A, provided it has an available allocation. In this manner, as client computers 12 formerly connected to old leader server A locate and ping new leader server B, new leader server B will issue authorization messages and adjust its distribution table 36 to include allocations previously managed by old leader server A. The distribution table 36 of new leader server B will then change accordingly.

However, if client computer A, in fail-over mode, sends a heartbeat to new leader server B, but new leader server B doesn't have an available allocation, new leader server B will first look for an available allocation in the free pool 48, and then in the available allocation record for old leader server A. However, in alternative embodiments, other sequences may be employed. New leader server B can determine the available allocation record of old leader server A from its own distribution table 36. If an available allocation is located in either of these sources, the available allocation is re-assigned to new leader server B, and the distribution tables 36 of new leader server B and follower server C are updated accordingly.

Figure 11:
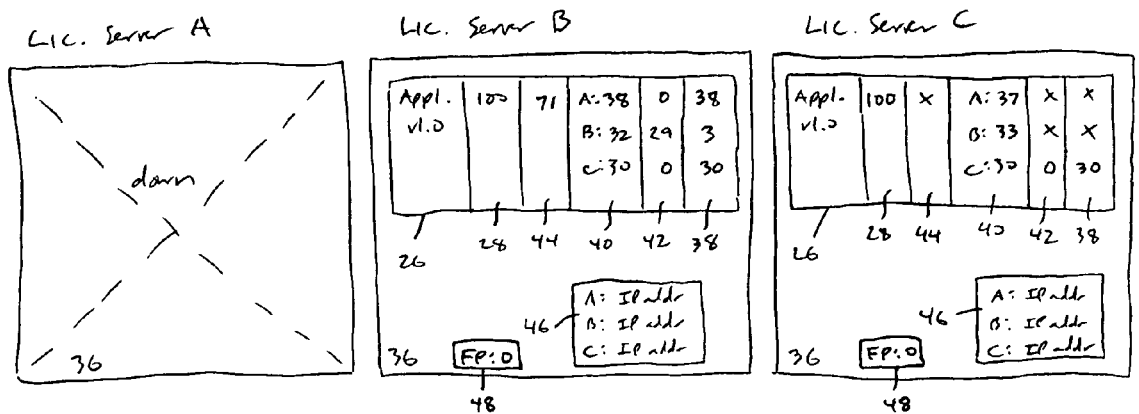
FIG. 11 is a generalized representation of the distribution tables of license servers A, B and C in a server pool comprising three license servers in the example of FIG. 10, after an authorization has been granted to client computer A by new leader server B in response to a heartbeat from client computer A in fail-over mode according to an embodiment of the present invention.

An example of fail-over will now be presented. Continuing the example of FIG. 10 presented herein for purposes of illustration only, assume that client computer A, in fail-over mode, sends a heartbeat to new leader server B. Because new leader server B has four allocations available, new leader server B will issue an authorization to client computer A. The distribution table 36 of new leader server B will then be modified as shown in FIG. 11, where the record for allocations available for all servers in the pool (see reference character 44) is decreased to 71, the allocations in use record for new leader server B (see reference character 42) is increased to 29, and the allocations available record for new leader server B (see reference character 38) is decreased to three.

Figure 12:
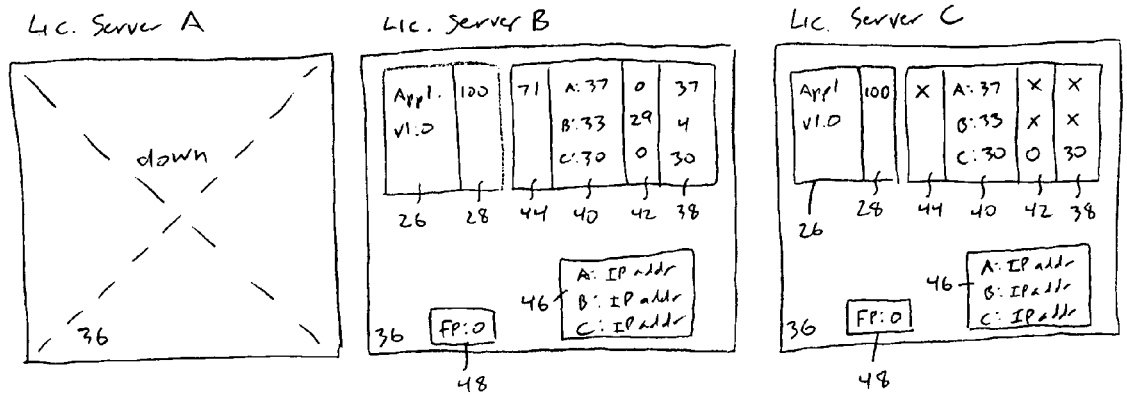
FIG. 12 is a generalized representation of the distribution tables of license servers A, B and C in a server pool comprising three license servers in the example of FIG. 10, after new leader server B has re-assigned an available allocation from old leader server A to new leader server B by updating the distribution table of new leader server B according to an embodiment of the present invention.

Thereafter, because the borrowing threshold has now been exceeded (29÷32=90.6%), new leader server B will attempt to borrow allocations from other sources. New leader server B therefore first looks for an available allocation in the free pool 48, but no available allocations are in the free pool 48. New leader server then looks for an available allocation in the available allocation record for old leader server A, and finds that 38 allocations are available. An allocation is then re-assigned from old leader server A to new leader server B, resulting in the distribution tables 36 within new leader server B and follower server C as illustrated in FIG. 12. It should be noted that in preferred embodiments, new leader server B does not immediately update its distribution table 36 and re-assign all of the allocations from old leader server A to new leader server B. Rather, allocations are re-assigned as needed. This is advantageous, because if old leader server A should come back up, it will receive whatever allocation remained in old leader server A from the distribution table 36 of new leader server B. If new leader server B immediately took all allocations from old leader server A, then old leader server A would receive no allocations when it came back up.

In preferred embodiments of the present invention, if no available allocations are found in the free pool 48 or the allocation of old leader server A, new leader server B will attempt to borrow an allocation from follower server C. If follower server C has an available allocation, the distribution tables 36 in follower server C and new leader server B are updated so that the available allocation is re-assigned to new leader server B. An advantage of re-assigning allocations from the old leader server A, if possible, before re-assigning allocations from follower server C, is that because follower server C is still up and working, it can send authorization messages to other client computers 12 that request authorization directly from follower server C, provided follower server C has available allocations. In contrast, the allocations of old leader server A will go unused unless the allocations of old leader server A are re-assigned. It should be noted that in alternative embodiments, borrowing is a utility that can be turned on or off by the network administrator.

Therefore, embodiments of the present invention provide a system and method for managing licenses on a network using multiple license servers that allows allocations to be distributed among the license servers and then re-assigned between license servers by updating the distribution tables of the license servers to facilitate a dynamic balancing of allocations among license servers that is based on actual usage. Embodiments of the present invention also allow allocations to be re-assigned from a nonfunctional (down) license server to a functioning license server to facilitate a dynamic balancing of allocations among license servers that is based on actual usage, and allow a network administrator to change the initial distribution of allocations, add allocations, or add license codes for protected software.

What is claimed is:

1. A system for balancing a distribution of allocations for protected software over a communication network according to a license policy, the system comprising:
   at least one client computer coupled to the communication network for requesting authorizations to use the protected software; and
   a pool of license servers coupled to the communication network, each license server in the pool is programmed for managing a distribution of allocations for at least one client computer coupled to the communication network to use the protected software;
   the pool of license servers including a current leader server programmed for updating the distribution of allocations to add at least one additional allocation to a particular license server if that particular license server has an insufficient number of allocations, wherein each license server in the pool can directly communicate with the at least one client computer coupled to the communication network, and wherein each license server in the pool manages the distribution of allocations substantially in the same manner as the other license servers in the pool;
   each license server further including a borrowing threshold and programmed for determining whether the particular license server did not have a sufficient number of allocations by dividing an allocations-in-use value for that particular license server by a total allocation value for that particular license server and determining if a quotient of the division is greater than the borrowing threshold.

2. A system as recited in claim 1, the current leader server further programmed for updating the distribution of allocations to add at least one additional allocation to a particular license server if that particular license server did not have a sufficient number of allocations at any time during processing of a request for authorization from a client computer.

3. A system as recited in claim 1, the current leader server further including memory for storing the distribution of allocations for all license servers in the pool.

4. A system as recited in claim 3, the current leader server further programmed for storing a new distribution of allocations in response to a change distribution criteria message containing the new distribution of allocations communicated to a license server.

5. A system as recited in claim 4:
   the license servers that are not the current leader server further programmed for communicating the change distribution criteria message to the current leader server if the license servers that are not the current leader server should receive a change distribution criteria message; and
   the current leader server further programmed for communicating the new distribution of allocations in the pool to all functioning license servers in the pool that are not the leader server through a distribution criteria sync message.

6. A system as recited in claim 3, the current leader server further programmed for adding allocations to the pool in response to an add allocations message containing a count of allocations to be added to particular protected software communicated to a license server.

7. A system as recited in claim 6:
   the license servers that are not the current leader server further programmed for communicating the add allocations messages to the current leader server if the license servers that are not the current leaders server should receive an add allocations message; and the current leader server further programmed for communicating an updated distribution of allocations in the pool to all functioning license servers in the pool that are not the leader server through a distribution criteria sync message.

8. A system as recited in claim 3, the current leader server further programmed for adding a new license code to the pool in response to an add license code message containing a license code to be communicated to a license server.

9. A system as recited in claim 8:
the license servers that are not the current leader server-further programmed for communicating the add license code message to the current leader server if the license servers that are not the current leader server should receive an add license code message; and
the current leader server further programmed for communicating an updated distribution table containing the stored license codes and corresponding distribution of allocations in the pool to all functioning license servers in the pool that are not the leader server through a distribution criteria sync message.

10. A system as recited in claim 3, the current leader server further programmed for updating the distribution of allocations to add at least one additional allocation to a particular license server if that particular license server did not have a sufficient number of allocations at any time during the processing of an update message received from at least one client computer operating in fail-over mode.

11. A system as recited in claim 10, wherein if the particular license server determines that it does not have a sufficient number of allocations at any time during the processing of an update message received from at least one client computer operating in fail-over mode, the current leader server is further programmed for:
looking for a source of available allocations by checking a count of available allocations in the leader server, a free pool, and any down license servers; and
decreasing the count of available allocations from the source of available allocations and increasing the count of available allocations for the particular license server if the source of available allocations is found.

12. A system as recited in claim 11, wherein if no source of available allocations is found by checking the count of available allocations in the leader server, the free pool, and any down license servers, the current leader server is further programmed for: looking for a source of available allocations by checking a count of available allocations in all functioning license servers not designated as the leader server; and decreasing the count of available allocations from the source of available allocations and increasing the count of available allocations for the particular license server if the source of available allocations is found.

13. A system as recited in claim 1, wherein if the particular license server determines that it does not have a sufficient number of allocations at any time during the processing of a request for authorization received from the client computer, the current leader server is further programmed for:
looking for a source of available allocations by checking a count of available allocations in a free pool, any down license servers, and the leader server; and
decreasing the count of available allocations from the source of available allocations and increasing the count of available allocations for the particular license server if the source of available allocations is found.

14. A system as recited in claim 13, the current leader server further programmed for communicating the updated distribution of allocations in the pool to all functioning license servers in the pool that are not the current leader server through a distribution criteria sync message.

15. A system as recited in claim 1, wherein each license server that is programmed for managing a distribution of allocation comprises a license server programmed to receive a request for authorization to use the protected software from at least one client computer and to allocate authorization for each client computer from which a request is received and for which an authorization is available.

16. A system as recited in claim 1, wherein each license server is programmed to receive a request for authorization to use the protected software from at least one client computer and, if an insufficient number of allocations are available, for obtaining at least one allocation from the lead server.

17. A system as recited in claim 1, wherein:
each license server in the pool is assigned an initial distribution of zero or more available allocations for using the protected software by the at least one client computer; and
the current leader server is programmed to re-distribute one or more available allocations among the license servers in the pool.

18. A system as recited in claim 1, wherein:
each license server in the pool is associated with a data storage device for storing a record of the number of allocations presently managed by that license server;
the current leader server is programmed to request a transfer of at least one allocation from a first license server to a second license server in the pool, in the event that the second license server is managing an insufficient number of available allocations; and
each license server in the pool are programmed to update the record of the number of allocations presently managed by the license server, following a transfer of at least one allocation from a first license server to a second license server.

19. A method for balancing a distribution of allocations for using protected software by at least one client computer coupled to a communication network, the method comprising the steps of:
coupling a pool of license servers to the communication network;
assigning a distribution of allocations to the pool;
programming each license server to the pool to manage the distribution of allocations including processing requests for authorization to use the protected software from at least one client computer coupled to the communications network;
designating a current leader server from the license servers in the pool and programming the current leader for updating the distribution of allocations to add at least one additional allocation to a particular license server if that particular license server has an insufficient number of allocations in response to a request for authorization received from a client computer,
wherein each license server in the pool can communicate directly with the at least one client computer coupled to the communication network,
wherein each license server in the pool manages the distribution of allocations substantially in the same manner as the other license servers in the pool, and
wherein updating the distribution of allocations includes:
assigning a borrowing threshold to each license server; and
determining whether the particular license server did not have a sufficient number of allocations by dividing an allocations-in-use value for that particular license server by a total allocations value for that particular license server and determining if a quotient of the division is greater than the borrowing threshold.

20. A method as recited in claim 19, wherein updating the distribution of allocations includes:
selecting one of the license servers in the pool as a current leader server for storing the distribution of allocations for all license servers in the pool and for managing a re-assignment of allocations to give at least one additional allocation to a particular license server if that particular license server did not have a sufficient number of allocations at any time during processing of a request for authorization received from the client computer.

21. A method as recited in claim 20, wherein when it is determined that the particular license server did not have sufficient number of allocations during the processing of a request for authorization received from the client computer, the method further includes:
looking for a source of available authorizations by checking a count of available authorizations in a free pool, any down license servers, and the current leader server; and
decreasing the count of available allocations from the source of available allocations and increasing the count of available allocations for the particular license server if the source of available allocations is found.

22. A method as recited in claim 21, further including: communicating the updated distribution of allocations in the pool to all functioning license servers in the pool that are not the current leader server through a distribution criteria sync message.

23. A method as recited in claim 20, further including: updating the distribution of allocations by communicating a change distribution criteria message containing a new distribution of allocations to at least one license server.

24. A method as recited in claim 23, wherein updating the distribution of allocations by communicating a change distribution criteria message further includes:
communicating the change distribution criteria message to the current leader server;
updating the distribution of allocations in the pool in the current leader server; and
communicating the updated distribution of allocations in the pool to all other functioning license servers in the pool that are not the current leader server through a distribution criteria sync message.

25. A method as recited in claim 20, further including: adding allocations to the pool by communicating an add allocations message containing a count of allocations to be added to particular protected software to at least one license server.

26. A method as recited in claim 25, wherein adding allocations to the pool by communicating an add allocations message further includes:
communicating the add allocations message to the current leader server;
updating the distribution of allocations in the pool in the current leader server; and
communicating the updated distribution of allocations in the pool to all other functioning license servers in the pool that are not the current leader server through a distribution criteria sync message.

27. A method as recited in claim 20, further including:
adding a new license code for protected software to the pool by communicating an add license code message containing a license code to be added to at least one license server.

28. A method as recited in claim 27, wherein adding a license code for protected software to the pool by communicating an add license code message further includes:
communicating the add license code message to the current leader server;
updating a distribution table containing the stored license codes and corresponding distribution of allocations in the pool in the current leader server; and
communicating the updated distribution table to all other functioning license servers in the pool that are not the current leader server through a distribution criteria sync message.

29. A method as recited in claim 20, further including:
updating the distribution of allocations to add at least one additional allocation to a particular license server if that particular license server did not have a sufficient number of allocations during the processing of an update message received from at least one client computer operating in fail-over mode.

30. A method as recited in claim 29, wherein when it is determined that the particular license server did not have a sufficient number of allocations during the processing of an update message received from at least one client computer operating in fail-over mode, the method further includes:
looking for a source of available allocations by checking a count of available allocations in the current leader server, a free pool, and any down license servers; and
decreasing the count of available allocations from the source of available allocations and increasing the count of available allocations for the particular license server if the source of available allocations is found.

31. A method as recited in claim 30, wherein if no source of available allocations is found by checking the count of available allocations in the current leader server, the free pool, and any down license servers, the method further includes:
looking for a source of available allocations by checking a count of available allocations in all functioning license servers not designated as the current leader server; and
decreasing the count of available allocations from the source of available allocations and increasing the count of available allocations for the particular license server if the source of available allocations is found.

* * * * *